US007565383B2

(12) United States Patent
Gebhart et al.

(10) Patent No.: US 7,565,383 B2
(45) Date of Patent: Jul. 21, 2009

(54) APPLICATION RECOVERY

(75) Inventors: Alexander Gebhart, Bad Schoenborn (DE); Erol Bozak, Pforzheim (DE)

(73) Assignee: SAP AG., Walldorf (DE)

( * ) Notice: Subject to any disclaimer, the term of this patent is extended or adjusted under 35 U.S.C. 154(b) by 488 days.

(21) Appl. No.: 11/017,088

(22) Filed: Dec. 20, 2004

(65) Prior Publication Data

US 2006/0136506 A1 Jun. 22, 2006

(51) Int. Cl.
*G06F 17/30* (2006.01)
(52) U.S. Cl. .......................................... 707/202; 707/3
(58) Field of Classification Search ................. 707/3–5, 707/10, 202, 204; 717/100, 171, 176
See application file for complete search history.

(56) References Cited

U.S. PATENT DOCUMENTS

| | | | |
|---|---|---|---|
| 5,276,789 A | 1/1994 | Besaw et al. | |
| 5,440,722 A | 8/1995 | VanderSpek et al. | |
| 5,539,883 A | 7/1996 | Allon et al. | |
| 5,572,724 A | 11/1996 | Watanabe et al. | |
| 5,659,694 A | 8/1997 | Bibayan | |
| 5,699,532 A | 12/1997 | Barrett et al. | |
| 5,761,429 A | 6/1998 | Thompson | |
| 5,784,552 A | 7/1998 | Bishop et al. | |
| 5,996,012 A | 11/1999 | Jarriel | |
| 6,009,455 A | 12/1999 | Doyle | |
| 6,061,505 A | 5/2000 | Pitchaikani et al. | |
| 6,098,108 A | 8/2000 | Sridhar et al. | |
| 6,182,086 B1 * | 1/2001 | Lomet et al. ................. | 707/202 |
| 6,209,018 B1 | 3/2001 | Ben-Shachar et al. | |
| 6,226,675 B1 | 5/2001 | Meltzer et al. | |
| 6,256,740 B1 | 7/2001 | Muller et al. | |
| 6,289,382 B1 | 9/2001 | Bowman-Amuah | |
| 6,385,639 B1 | 5/2002 | Togawa | |
| 6,401,097 B1 | 6/2002 | McCotter et al. | |
| 6,453,349 B1 | 9/2002 | Kano et al. | |
| 6,466,980 B1 | 10/2002 | Lumelsky et al. | |
| 6,502,131 B1 | 12/2002 | Vaid et al. | |
| 6,615,278 B1 | 9/2003 | Curtis | |
| 6,628,304 B2 | 9/2003 | Mitchell et al. | |
| 6,650,347 B1 | 11/2003 | Nulu et al. | |
| 6,751,795 B1 | 6/2004 | Nakamura | |

(Continued)

FOREIGN PATENT DOCUMENTS

WO    WO /1/13227    2/2001

OTHER PUBLICATIONS

Xianan Zhang et al., Fault-tolerant Grid Services Using Primary-Backup: Feasibility and Performance, IEEE, pp. 105-114, IEEE, 2004.*

(Continued)

*Primary Examiner*—Cheryl Lewis
(74) *Attorney, Agent, or Firm*—Finnegan, Henderson, Farabow, Garrett & Dunner L.L.P.

(57) ABSTRACT

A method includes, in a grid network, querying a grid manager for assignment of a resource for execution of an application, the query including a grid application recovery request, assigning a resource having a grid application recovery service in response to the grid application recovery request, establishing a communication channel between the assigned resource and a recovery application on a recovery resource, and storing recovery information over the communication channel on the recovery resource during execution of the application.

24 Claims, 2 Drawing Sheets

U.S. PATENT DOCUMENTS

| | | |
|---|---|---|
| 6,775,830 B1 | 8/2004 | Matsunami et al. |
| 6,789,170 B1 | 9/2004 | Jacobs et al. |
| 6,799,251 B1 | 9/2004 | Jacobs et al. |
| 6,826,568 B2 | 11/2004 | Bernstein et al. |
| 6,832,220 B1 | 12/2004 | Rahman |
| 6,834,301 B1 | 12/2004 | Hanchett |
| 6,859,834 B1 | 2/2005 | Arora et al. |
| 6,912,587 B1 | 6/2005 | O'Neil |
| 6,967,728 B1 | 11/2005 | Vidyanand |
| 6,976,258 B1 | 12/2005 | Goyal et al. |
| 7,010,596 B2 | 3/2006 | Bantz et al. |
| 7,051,107 B2 | 5/2006 | Morikawa |
| 7,096,248 B2 | 8/2006 | Masters et al. |
| 7,130,891 B2 * | 10/2006 | Bernardin et al. ........... 709/218 |
| 7,171,470 B2 | 1/2007 | Doyle et al. |
| 7,171,654 B2 | 1/2007 | Werme et al. |
| 7,181,743 B2 | 2/2007 | Werme et al. |
| 7,185,046 B2 | 2/2007 | Ferstl et al. |
| 7,234,032 B2 | 6/2007 | Durham et al. |
| 7,322,031 B2 | 1/2008 | Davis et al. |
| 7,328,406 B2 | 2/2008 | Kalinoski et al. |
| 2001/0049594 A1 | 12/2001 | Klevans |
| 2001/0054034 A1 | 12/2001 | Arning et al. |
| 2002/0019844 A1 | 2/2002 | Kurowski et al. |
| 2002/0167954 A1 | 11/2002 | Highsmith et al. |
| 2002/0194251 A1 | 12/2002 | Richter et al. |
| 2003/0003068 A1 | 1/2003 | Nickel et al. |
| 2003/0033369 A1 | 2/2003 | Bernhard |
| 2003/0041130 A1 | 2/2003 | Harrisville-Wolff et al. |
| 2003/0041142 A1 | 2/2003 | Zhang et al. |
| 2003/0088580 A1 | 5/2003 | Desai et al. |
| 2003/0093528 A1 | 5/2003 | Rolia |
| 2003/0101331 A1 | 5/2003 | Boylan et al. |
| 2003/0126196 A1 | 7/2003 | Lagimonier et al. |
| 2003/0126265 A1 | 7/2003 | Aziz et al. |
| 2003/0197726 A1 | 10/2003 | Weitzman |
| 2004/0179481 A1 | 9/2004 | Graupner |
| 2004/0194084 A1 | 9/2004 | Matsunami et al. |
| 2004/0215590 A1 | 10/2004 | Kroening |
| 2004/0215973 A1 | 10/2004 | Kroening |
| 2004/0225711 A1 | 11/2004 | Burnett et al. |
| 2004/0255291 A1 | 12/2004 | Sierer et al. |
| 2004/0261053 A1 | 12/2004 | Dougherty et al. |
| 2004/0268147 A1 | 12/2004 | Wiederin et al. |
| 2004/0268293 A1 | 12/2004 | Woodgeard |
| 2005/0015437 A1 | 1/2005 | Strait |
| 2005/0015643 A1 | 1/2005 | Davis et al. |
| 2005/0027785 A1 | 2/2005 | Bozak et al. |
| 2005/0027812 A1 | 2/2005 | Bozak et al. |
| 2005/0027813 A1 | 2/2005 | Bozak et al. |
| 2005/0027843 A1 | 2/2005 | Bozak et al. |
| 2005/0027864 A1 | 2/2005 | Bozak et al. |
| 2005/0027865 A1 | 2/2005 | Bozak et al. |
| 2005/0044251 A1 | 2/2005 | Bozak et al. |
| 2005/0060272 A1 | 3/2005 | Lin |
| 2005/0076105 A1 | 4/2005 | Keohane et al. |
| 2005/0076339 A1 | 4/2005 | Merril et al. |
| 2005/0131898 A1 | 6/2005 | Fatula, Jr. |
| 2005/0138156 A1 | 6/2005 | Gebhart et al. |
| 2005/0138618 A1 | 6/2005 | Gebhart |
| 2005/0149294 A1 | 7/2005 | Gebhart |
| 2005/0160107 A1 | 7/2005 | Liang |
| 2005/0160423 A1 | 7/2005 | Bantz et al. |
| 2005/0165912 A1 | 7/2005 | Colbeck et al. |
| 2005/0235055 A1 | 10/2005 | Davidson |
| 2006/0005181 A1 | 1/2006 | Fellenstein et al. |
| 2006/0015285 A1 | 1/2006 | Fuller et al. |
| 2006/0075070 A1 | 4/2006 | Merissert-Coffinieres et al. |
| 2006/0168158 A1 | 7/2006 | Das |
| 2006/0168174 A1 | 7/2006 | Gebhart et al. |
| 2006/0294238 A1 | 12/2006 | Naik et al. |
| 2008/0052729 A1 | 2/2008 | Paul et al. |

OTHER PUBLICATIONS

European Search Report for Application No. 05027222.8, dated May 18, 2006 (9 pages).

Zhang et al., "Fault-tolerant Grid Services Using Primary-Backup: Feasibility and Performance," Cluster Computing, 2004 IEEE International Conference, San Diego, CA, Sep. 20-23, 2004, pp. 105-114.

Goodale et al., "Checkpoint/Recovery in Cactus 4.0," Oct. 16, 2002 (7 pages).

Sgaravatto et al., "Grid Checkpoinging in the European DataGrid Project," Oct. 16, 2002 (5 pages).

Jared Nabrzyski et al., "Grid Resource Management, State of the Art and Future Trends," Sep. 2003, Kluwer Academic Publishers.

European Search Opinion, dated May 18, 2006, for corresponding EP Application No. 05 027 222.8 (5 pages).

European Examination Report, dated Aug. 1, 2007, for corresponding EP Application No. 05 027 222.8 (5 pages).

Schopf et al., Jennifer M., "Grid Resource Management: State of the Art and Future Trends," [Online] Sep. 2003 (Sep. 2003), Retrieved from the Internet: URL:http://www-unix.mcs.anl.gov/~schopf. BookFinal.pdf> [retrieved on May 10, 2007].

Cactus 4.0, User's Guide, Rev. 1.45, Chapter D9, dated Jan. 19, 2004 (3 pages).

U.S. Appl. No. 12/326,441, finad Dec. 2, 2008 entitled "Grid Organization."

About Grid computing [online]. IBM, [retrieved on Apr. 14, 2001]. Retrieved from the Internet: http://www-1.ibm.com/grid/about_grid/index.shtml (1 page).

"Caching In on the Enterprise Grid Turbo-Charge Your Applications with OracleAS Web Cache," An Oracle Technical White Paper, <<http://www.oracle.com/technology/products/ias/web_cache/pdf/WebCache1012_twp.pdf>>, Feb. 7, 2006.

"eserver xSeries 335 Type 8676 User's Guide," Feb. 2003, IBM Product User's Guide, Chapter 1, pp. 1-12.

FAQ [online]. IBM, [retrieved on Apr. 14, 2004]. Retrieved from the Internet: http://www-1.ibm.com/grid/about grid/faq.shtml. (4 pages).

"Fundamentals of Grid Computing," IBM Redbooks - file: redp6313. Copyright Nov. 2002.

Grid Benefits [online]. IBM, [retrieved on Apr. 14, 2004]. Retrieved from the Internet: http://www-1.ibm.com/grid/about grid/benefits.shtml. (2 pages).

"Grid Computing Q&A with Benny Souder, Vice President, Distributed Database Development, Database and Application Server Technologies," May 22, 2003, pp. 1-9.

"How Sun™ Grid Engine, Enterprise Edition 5.3 Works," Policy Systems in Sun Grid Engine, Enterprise Edition 5.3 Software, 1-16 (Nov. 2001).

"hp blade server data sheet," HP Blade Server Data Sheet, Nov. 2001, pp. 2-6.

IBM and grid: E-business on demand [online]. IBM, [retrieved on Apr. 14, 2004]. Retrieved from the Internet: http://www-1.ibm.com/grid/about grid/ibm grid/ebod.shtml. (1 page).

IBM and grid: How IBM is using grid [online]. IBM, [retrieved on Apr. 14, 2004]. Retrieved from the Internet: http://www-1.ibm.com/grid/about grid/ibm grid/gridtoday.shtml. (1 page).

IBM and grid: Open standards [online]. IBM, [retrieved on Apr. 14, 2004]. Retrieved from the Internet: http://www-1.ibm.com/grid/about grid/ibm grid/open standards.shtml. (1 page).

IBM and grid: Overview [online]. IBM, [retrieved on Apr. 14, 2004]. Retrieved from the Internet: http://www-1.ibm.com/grid/about grid/ibm grid/index.shtml. (1 page).

IBM and grid: Products and services [online]. IBM, [retrieved on Apr. 14, 2004]. Retrieved from the Internet: http://www-1.ibm.com/grid/about grid/ibm grid/products services.shtml. (2 pages).

"IBM eserver xSeries 335," Publication date unknown, IBM Data Sheet, accessed online on Dec. 27, 2004 at <http://www.ibm.com/servers/uk/eserver/xseries/literature/xseries_335.html>, 2 pages.

IBM Grid computing [online]. IBM, [retrieved on Apr. 14, 2004]. Retrieved from the Internet: http://www-1.ibm.com/linux/grid/. 1 page.

IBM and grid: Strategic relationships [online]. IBM, [retrieved on Apr. 14, 2004]. Retrieved from the Internet: http://www-1.ibm.com/grid/about grid/ibm grid/strategic relation.shtml. (1 page).

"Intro to Grid Computing with Globus," IBM Redbooks - file: sg246895. Copyright Sep. 2003.

Oracle Grid Computing Technologies [online]. Oracle, [retrieved on Apr. 15, 2004]. Retrieved from the Internet: http://otn.oracle.com/products/oracle9i/grid computing/index.html. (2 pages).

"Sun Cluster Architecture," Sun Microsystems, Inc. 1-42 (2002).

"Sun Powers the Grid," Sun Microsystems, Inc., 1-7 (Feb. 2002).

"Sun's Grid Computing Solutions Outdistance the competition," Aberdeen Group, Inc., 1-20 (May 2002).

What is grid computing [online]. IBM, [retrieved on Apr. 14, 2004]. Retrieved from the Internet: http://www-1.ibm.com/grid/about grid/what is.shtml (1 page).

Allcock, et al., "GridMapper: A Tool for Visualizing the Behavior of Large-Scale Distributed Systems," Proceedings 11th IEEE International Symposium on High Performance Distributed Computing IEEE Comput. Soc., Piscataway, NJ, pp. 179-187, Jul. 2002.

Allen, et al., "The Catus Worm: Experiments With Dynamic Resource Discovery and Allocation in a Grid Environment," International Journal of High Performance Computing Applications Sage Science Press, vol. 15, No. 4, pp. 345-358, 2001.

Baldridge, Kim K. et al., "QMView and GAMESS: Integration into the World Wide Computational Grid," IEEE, pp. 1-25, 2002.

Beiriger, Judy et al., "Constructing the ASCI Computational Grid," 2000, p. 193-9, IEEE Comput. Soc., Los Alamitos, CA.

Berman et al., "The GrADS Project: Software Support for High-Level Grid Application Development," International Journal of High Performance Computing Applications, Sage Science Press, vol. 15, No. 4, pp. 327-344, Jul. 31, 2001.

Berman, Fran et al., "Application-Level Scheduling on Distributed Heterogeneous Networks (Technical Paper)," Proceedings of Supercomputing '96, 1996, Article No. 39, pp. 1-28, University of California - San Diego, La Jolla, CA.

Berstis, Viktors, "Fundamentals of Grid Computing," IBM Corporation, Redbooks Paper, 1-28 (2002).

Braden, R. et al., "Resource ReSerVation Protocol (RSVP), Version 1 Functional Specification," Aug. 12, 1996.

Chase, Jeffrey S., et al., "Dynamic Virtual Clusters in a Grid Site Manager," High Performance Distributed Computing, 2003, Proceedings 12th IEEE International Symposium on Jun. 22-24, 2003, pp. 90-100.

Chuang, Liu et al., "Design and Evaluation of a Resource Selection Framework for Grid Applications," High Performance Distributed Computing 2002, HPDC-11, 2002, Proceedings 11th IEEE International Symposium, Jul. 23-26, 2002, pp. 63-72.

Czajkowski et al., "Grid Information Services for Distributed Resource Sharing," Proceedings 10th IEEE International Symposium on High Performance Distributed Computing., pp. 1-14, Aug. 2001.

Czajkowski, Karl et al., "A Resource Management Architecture for Metacomputing Systems," 1998, vol. 1459, pp. 62-82, University of Southern California, Marina del Rey, CA; Mathematics and Computer Science Division, Argonne, IL.

Czajkowski, Karl et al., "Grid Information Services for Distributed Resource Sharing," The University of Chicago; California State University, Northridge; University of Southern California; Argonne National Laboratory, Argonne, IL.

Czajkowski, Karl et al., "Resource Co-Allocation in Computational Gride: High-Performance Distributed Computing Archive," Proceedings of the 8th IEEE International Symposium on High Performance Distributed Computing Table of Contents, 1999.

Dubinsky et al., "A Flexible Rerouting Protocol in ATM Networks," IEEE Infocom '99, Conference on Computer Communications, Proceedings, 18th Annual Joint Conference of the IEEE Computer and Communications Societies, vol. 3, pp. 1488-1496, Mar. 1999.

El-Ghazawi, Tarek et al., "A Performance Study of Job Management Systems," Concurrency and Computation: Practice and Experience, John Wiley & Sons, Ltd., pp. 1229-1246, vol. 16 Issue 13, Oct. 2004.

European Search Report dated Mar. 1, 2006 pertaining to Application No. 05027221.0-2211.

Ferreira, et al., "Grid computing with the IBM Grid Toolbox," IBM Corporation, Redbooks, Draft, 1-281, Review (Apr. 12, 2004).

Ferreira, et al., "Introduction to Grid Computing with Globus," IBM Corporation, Redbooks, 2nd Edition, 1-268, (2003).

Ferris, Michael et al., "NEOS and CONDOR: Solving Optimization Problems Over the Internet," CRPC-TR98763-S, Mar. 1998, pp. 1-18, Rice University, Houston, TX.

Foster, Ian et al., "A Distributed Resource Management Architecture that Supports Advance Reservations and Co-allocation," IEEE 1999.

Foster, Ian et al., "A Grid-Enabled MPI: Message Passing in Heterogeneous Distributed Computer System," 1998, pp. 1-9, IEEE Comput. Soc., Los Alamitos, CA.

Foster, Ian et al., "A Quality of Service Architecture that Combines Resource Reservation and Application Adaptation," 2000, pp. 181-188, IEEE, Piscataway, NJ.

Foster, Ian et al., "The Anatomy of the Grid," Enabling Scalable Virtual Organizations. Argonne National Library, Argonne, IL; University of Chicago, Chicago, IL; University of Southern California, Marina del Rey, CA., 2001.

Foster, Ian et al., "The Anatomy of the Grid: Enabling Scalable Virtual Organizations," The International Journal of High Performance Computing Applications, vol. 5, No. 3, Fall 2001.

Foster, Ian et al., "The Physiology of the Grid," 2002, An Open Grid Services Architecture for Distributed Systems Integration, pp. 1-31, Argonne National Laboratory, Argonne, IL; University of Chicago, Chicago, IL; University of Southern California, Marina del Rey, CA; IBM Corporation, Poughkeepsie, NY.

Frey, James et al., "Condor-G: A Computation Management Agent for Multi-Institutional Grids," 2002, vol. 5, No. 3, pp. 237-246, Kluwer Academic Publishers, Netherlands.

Gawor et al., "CoG Kits: A Bridge Between Commodity Distributed Computing and High-Oerformance," Retrieved from the Internet: http://www-unix.mcs.anl.gov, Jun. 2000.

Goteti, Srikanth et al., "Communication Pattern Based Node Selection for Shared Networks," 2003, pp. 69-76, IEEE Comput. Soc., Los Alamitos, CA.

Goux, Jean Pierre et al., "An Enabling Framework for Master-Worker Applications on the Computational Grid," Mar. 10, 2000.

Goyal, Brajesh, "Oracle and the Grid," An Oracle White Paper, Oracle Corporation, 1-15 (Nov. 2002).

Injey, Franck, "External Time Reference (ETR) Requirements on z990," IBM Corporation, Redbooks Flash, 1-20 (2004).

International Search Report for PCT/EP2004/008406.
International Search Report for PCT/EP2004/008407.
International Search Report for PCT/EP2004/008408.
International Search Report for PCT/EP2004/008409.
International Search Report for PCT/EP2004/008448.
International Search Report for PCT/EP2004/008449.

Jang et al., "A Path Based Internet Cache Design for GRID Application," Lecture Notes in Computer Science, Dec. 2003, pp. 455-458.

Konya, B., "The NorduGrid Information System," Retrieved from the Internet: http://www.nordugrid.org, Sep. 16, 2002.

Konya, B., et al., "The NorduGrid Architecture and Tools," Retrieved from the Internet: http://www.nordugrid.org, Mar. 2002.

Lacan, Francis, "A Perfect World? A model for transormation," IBM Business Consulting Services, 1-12, (Apr. 2003).

Lee et al., "visPerf. Monitoring Tool for Grid Computing," Retrieved from the Internet: http://icl.cs.utk.edu.projectsfiles/netsolve/pubs/visperf.pdf, pp. 1-13, Jun. 2003.

Limaye, K. et al., "Grid aware HA-OSCAR," high Performance Computing Systems and Applications, 2005. HPCS 2005. 19th International Symposium on, vol. No. pp. 333-339, May 15-18, 2005.

Litzkow, Michael J. et al., "Condor - A Hunter of Idle Workstations," University of Wisconsin, Madison, WI; 1988, IEEE.

Liu, et al., "Design and Evaluation of a Resource Selection Framework for Grid Applications," Proceedings 11th IEEE International Symposium on High Performance Distributed Computing IEEE Comput. Soc., Piscataway, NJ, pp. 63-72, Jul. 2002.

Lowekamp, Bruce et al., "A Resource Query Interface for Network-Aware Applications," 1999, vol. 2, No. 2, pp. 139-151, Baltzer, Netherlands.

Min, et al., "A CICS to Linuz Grid Implementation," IBM Corporation, Redbooks Paper, 1-24 (2003).

Papakhian, Mary et al. "Comparing Job-Management Systems: The User's Perspective," Technology News and Reviews, IEEE Computational Science & Engineering, Apr.-Jun. 1998.

Rajkumar Buyya; Nimrod/G., "An Architecture for a Resource Management and Scheduling System in a Global Computational Grid," IEEE Computer Society Press, USA, 2000.

Rajkumar, Buyya, "Economic-based Distributed Resource Management and Scheduling for Grid Computing," Apr. 2002.

Sandholm, Thomas et al., "Java OGSI Hosting Environment Design A Portable Grid Service Container Framework," 2002, pp. 1-20, Argonne National Laboratory, IBM Poughkeepsie, NY.

Smith, Gordon, "Oracle RAC 10g Overview," An Oracle White Paper, Oracle Corporation, 1-15 (Nov. 2003).

Soulder, Benny, "On The Grid," Oracle Corporation, 1-4 (2004).

Special Edition Using Microsoft Excel 2000, Copyright 1999 by Que Corpl. p. 67-68.

Tierney, et al., White Paper: A Grid Monitoring Service Architecture (DRAFT), Retrieved from the internet http://citeseer.ist.psu.edu/530951.htm, Feb. 2001.

Ting et al., "3LS: A Peer-to-Peer Network Simulator," Copyright Sep. 2003.

Tuecke, S., "Open Grid Services Infrastructure (OGSI) Version 1.0," ogsi-wg@ggf.org, Jun. 27, 2003.

Vadhiyar et al., "A Performance Oriented Migration Framework for the Grid," Proceedings of the Third IEEE/ACM International Symposium on Cluster Computing and the Grid IEEE Comput. Soc., Los Alamitos, CA, pp. 130-137, May 2003.

von Laszewski et al., "InfoGram: A Grid Service that Supports Both Information Queries and Job Execution," 2002, pp. 333-342, IEEE Computer Society, Proceedings of the 11th IEEE International Symposium on High Performance Distributed Computing, (HPDC '02).

Von Laszewski, et al., "Designing Grid-based Problem Solving Environments and Portals," Proceedings of the 34th Annual Hawaii International Conference on System Science IEEE Comput. Soc., Los Alamitos, CA, pp. 1-10, Jan. 2001.

Von Laszewski, et al., "Grid-Based Asynchronous Migration of Execution Context in Java Virtual Machines," Euro-Par 2000 Parallel Processing, 6th International Euro-Par Conference Proceedings, Lecture Notes in Computer Science, vol. 1900, pp. 22-34, Sep. 2000.

Waananen, et al., "An Overview of an Architecture Proposal for a High Energy Physics Grid," Applied Parallel Computing, Advanced Scientific Computing, 6th International Conference, pp. 76-86, Jun. 2002.

Walsh, et al., "Staged Simulation for Improving Scale and Performance of Wireless Network Simulations," Institute of Electrical and Electronics Engineers, Proceedings of the 2003 Winter Simulation Conference, New Orleans, Dec. 7-10, 2003, IEEE, vol. 2 of 2, pp. 667-675.

Zenses, Ralf, "N1 Grid Advanced Architecture for SAP Operating concept for SAP Infrastructure," Germany/Austria Sun Microsystems GmbH, Mar. 5, 2004, pp. 1-34.

* cited by examiner

APPLICATION RECOVERY

TECHNICAL FIELD

The present invention relates to data processing by digital computer, and more particularly to application recovery.

BACKGROUND

Grid computing is a form of distributed system wherein computing resources are shared across networks. Grid computing enables the selection, aggregation, and sharing of information resources resident in multiple administrative domains and across geographic areas. These information resources are shared, for example, based upon their availability, capability, and cost, as well as a user's quality of service (QoS) requirements. Grid computing can mean reduced cost of ownership, aggregated and improved efficiency of computing, data, and storage resources, and enablement of the creation of virtual organizations for applications and data sharing.

SUMMARY

The present invention provides methods and apparatus, including computer program products, for application recovery in a grid network.

In one aspect, the invention features a method including in a grid network, querying a grid manager for assignment of a resource for execution of an application, the query including a grid application recovery request, assigning a resource having a grid application recovery service in response to the grid application recovery request, establishing a communication channel between the assigned resource and a recovery application on a recovery resource, and storing recovery information over the communication channel on the recovery resource during execution of the application.

In embodiments, the grid application recovery request can be an extended markup language (XML) file describing which parts of the application are to be saved during execution, how often the parts are to be saved, and a description of the communication channel.

Establishing can include passing the XML file to the recovery application on the recovery resource. Storing can include interrupting the execution of the application in accordance with instructions contained in the XML file, saving the parts of the executing application by the recovery application on the recovery resource as indicated by the instructions in the XML file and resuming the execution of the application.

The method can include restoring parameters stored in the recovery information to the application in the event of a premature termination of the execution of the application, and restarting the execution of the application.

The grid application recovery service can be a web service executing inside a grid container on the recovery resource.

Embodiments of the invention may have one or more of the following advantages.

Application developers do not have to implement a functionality that saves a state of their applications regularly.

Application developers do not have to be concerned about which location the persistent data has to be stored or how their applications get the correct parameters at startup to be able to recover from an unplanned and premature application execution.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
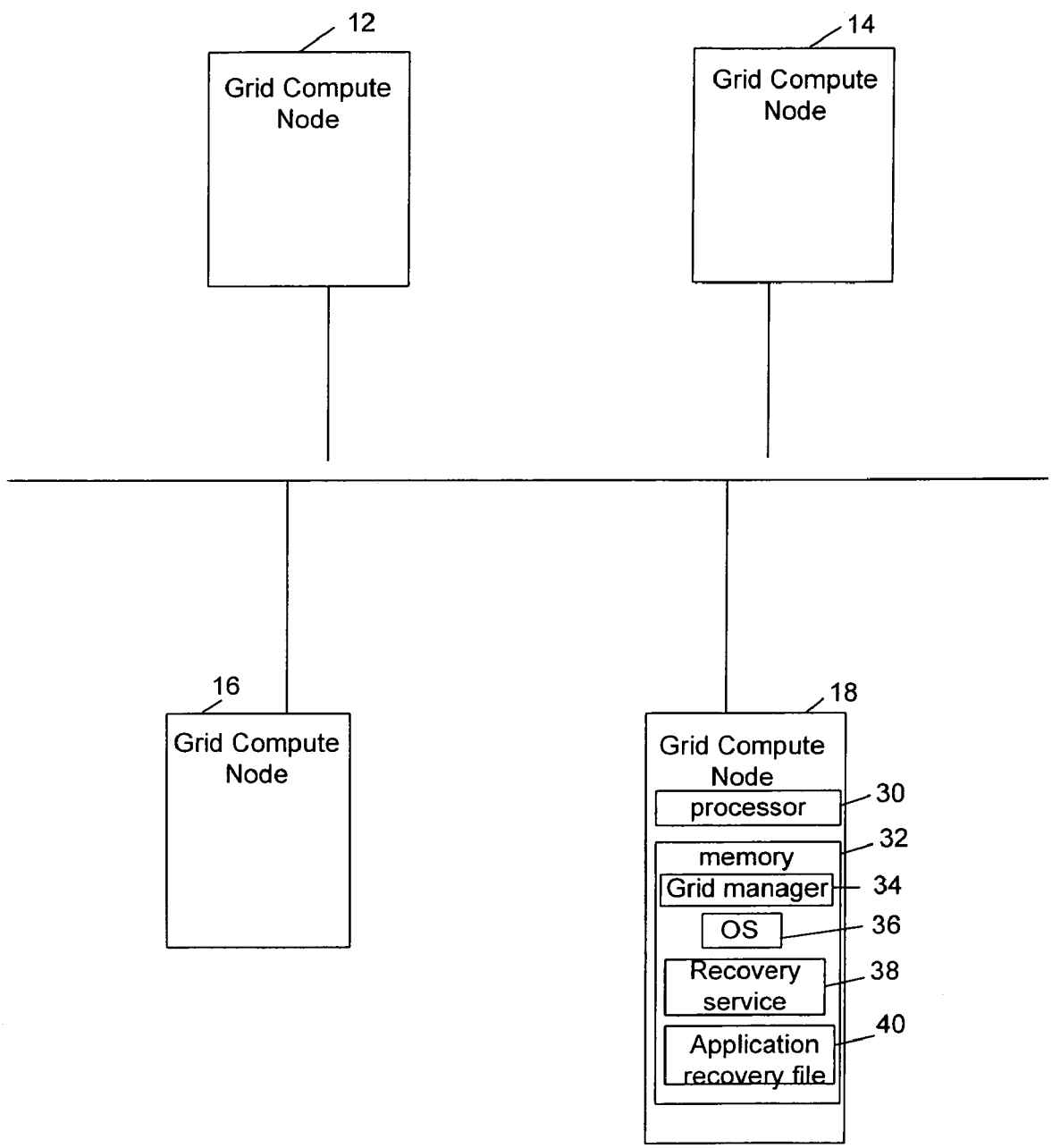
FIG. 1 is block diagram.

As shown in FIG. 1, a grid network 10 in accordance with one embodiment of the invention includes a number of interconnected grid compute nodes 12, 14, 16, 18. In an example, the grid network 10 is implemented as a client-server network. Client/server describes a relationship between two computer programs in which one program, the client, makes a service request from another program, the server, which fulfills the request. Although the client/server idea can be used by programs within a single computer, it is a more important idea in a network, such at network 10. In a network, the client/server model provides a convenient way to interconnect programs that are distributed efficiently across different locations.

In the client/server model, one server, sometimes called a daemon, is activated and awaits client requests. Typically, multiple client programs share the services of a common server program. Both client programs and server programs are often part of a larger program or application. Relative to the Internet, a Web browser is a client program that requests services from a Web server in another computer somewhere on the Internet.

Each of the grid compute nodes, grid compute node 18 for example, can include a processor 30 and a memory 32. Memory 32 includes a grid manager 34 and an operating system (OS) 36, such as Unix, Linux or Windows.

Each of the grid compute nodes 12, 14, 16, and 18 include grid-enabled applications capable of executing in response to a request to perform a task. In the event of a crash or premature termination, some of the grid-enabled applications require that their current state of execution and intermediate results be preserved so as not to waste valuable processing power and time before the premature termination. Some of the grid compute nodes, such as grid compute node 18, include recovery service 38 residing in memory 32. Grid compute nodes in network 10 that include a recovery service are generally referred to as recovery resources. In one particular example, a recovery service resides in all of the grid compute nodes 12, 14, 16, and 18. In another particular example, the recovery service resides in one or more grid compute nodes in network 10.

In one embodiment, the recovery service 38 receives and maintains an application recovery file 40, such as an extended markup language (XML) file, from a grid-enabled application upon execution initiation. The application recovery file 40 can be received as metadata in request to execute an application in a grid compute node.

The application recovery file 40 stores the part or parts of a specific application to save, and how often the part or parts are to be saved, during execution. The application recovery file 40 also includes a description of a communications channel that is used to communicate between an application executing in a grid compute node and the recovery service 38.

The communications channel allows an external program (e.g., recovery service 38) to interrupt and continue executing application. In a particular example, this is implemented by having each application listen to a specific TCP/IP port that is specified at startup. In another particular example, an application exposes a web service that is used to send commands to the recovery service 38.

After an application execution is initiated, the recovery service 38 interrupts the executing application over the communications channel, obtains needed recovery information, saves the recovery information, and signals the application to continue. Recovery information can include, for example, saving certain files or certain data residing in a database.

More specifically, an application ready to execute in the grid network 10 queries a grid manager 34 or grid application scheduler to receive a list grid compute nodes available to handle the application execution. In the query (e.g., using the metadata) the application identifies itself to the grid manager as an application needing a grid-managed application recovery service. The application request also defines (e.g., using metadata) at which place an XML file can be found (e.g., by specifying a universal resource locator (URL)) and a description of a communications channel.

The grid manager 34 selects only grid compute nodes with an application recovery service in place. In embodiments, the application recovery service 34 is a grid service or web service running inside a grid container on a grid compute node, or an application running on a grid compute node.

The grid manager 34 employs the grid compute node and when the application is started an XML file passed to the application recovery service 38 that will track the application.

Once the application starts, the grid manager 34 sends a connect command to the application recovery service 38 and the application recovery service 38 connects to the application using the communication channel specified in the XML file.

As specified in the XML file, the application recovery service 38 interrupts the application at certain times and performs a save operation as specified in the XML file. After a successful save operation the application recovery service 38 sends a continue to the application.

In the application fails (e.g., crashes or fails to respond to an interrupt message in a specified amount of time), the application recovery service 38 acts according to the XML file, e.g., put files to certain locations or restore data in a database. The application is restarted.

Figure 2:
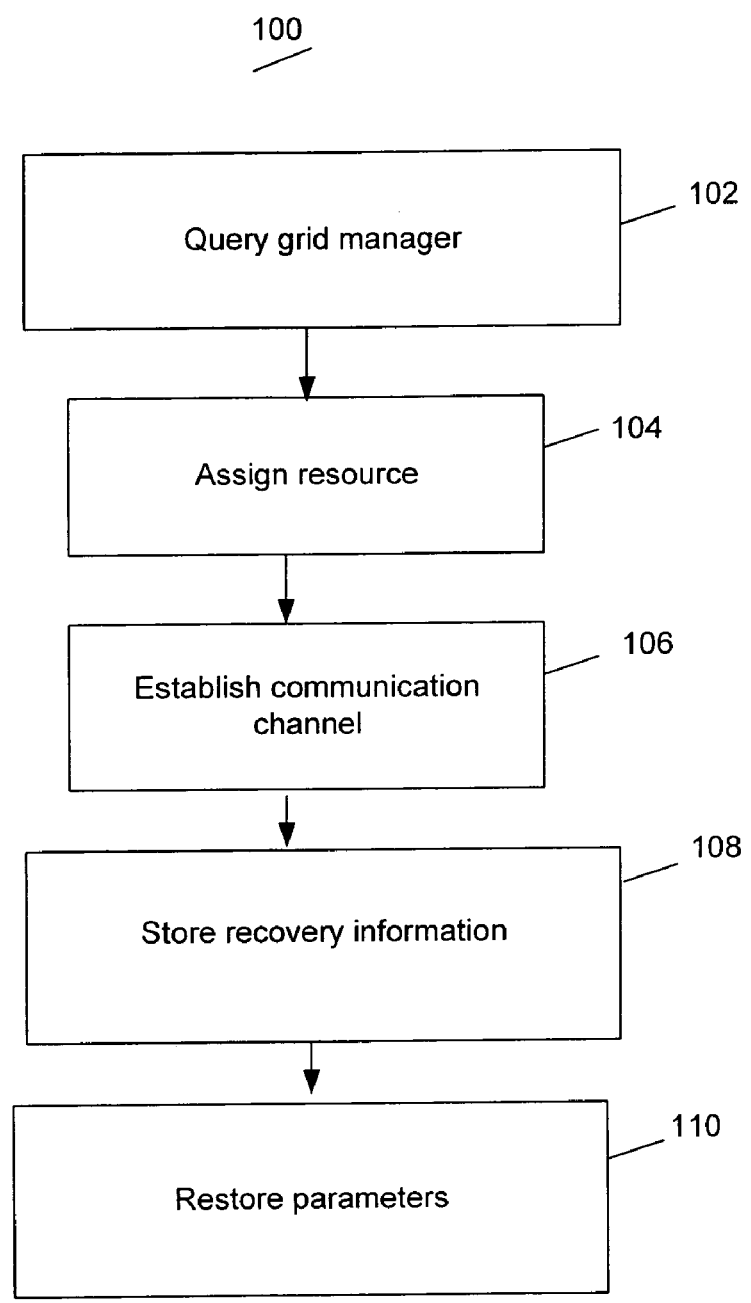
FIG. 2 is a flow diagram.
Like reference symbols in the various drawings indicate like elements.

As shown in FIG. 2, an application recovery process 100 includes, in a grid network, querying (102) a grid manager for assignment of a resource (e.g., grid compute node) for execution of an application, the query including a grid application recovery request. The grid application recovery request can include an extended markup language (XML) file describing which parts of the application are to be saved during execution, how often the parts are to be saved, and a description of a communication channel.

Process 100 assigns (104) a resource (e.g., grid compute node) having a grid application recovery service in response to the grid application recovery request. In a particular example, the grid application recovery service is a web service executing inside a grid container on a recovery resource.

Process 100 establishes (106) the communication channel between the assigned resource and a recovery application on a recovery resource. In a particular example, establishing (106) includes passing the XML file to the recovery application on the recovery resource.

Process 100 stores (108) recovery information over the communication channel on the recovery resource during execution of the application. Storing (108) includes interrupting the execution of the application in accordance with instructions contained in the XML file, saving the parts of the executing application by the recovery application on the recovery resource as indicated by the instructions in the XML file and resuming the execution of the application.

Process 100 restores (110) parameters stored in the recovery information to the application in the event of a premature termination of the execution of the application.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

What is claimed is:

1. A computer-implemented method comprising:

in a grid network, querying a grid manager for assignment of a resource for execution of an application, the query including a grid application recovery request;

assigning a resource having a grid application recovery service in response to the grid application recovery request;

establishing a communication channel between the assigned resource and a recovery application on a recovery resource; and storing recovery information over the communication channel on the recovery resource during execution of the application, wherein the grid application recovery request reflects at least one of parts of the application to be saved during execution, how often selected parts of the application are to be saved during execution, and a description of the communication channel.

2. The computer-implemented method of claim 1 wherein the grid application recovery request is an extended markup language (XML) file.

3. The computer-implemented method of claim 2 wherein establishing comprises passing the XML file to the recovery application on the recovery resource.

4. The computer-implemented method of claim 3 wherein storing comprises:
   interrupting the execution of the application in accordance with instructions contained in the XML file;
   saving the parts of the executing application by the recovery application on the recovery resource as indicated by the instructions in the XML file; and
   resuming the execution of the application.

5. The computer-implemented method of claim 1 further comprising restoring parameters stored in the recovery information to the application in the event of a premature termination of the execution of the application.

6. The computer-implemented method of claim 5 further comprising restarting the execution of the application.

7. The computer-implemented method of claim 1 wherein the grid application recovery service is a web service executing inside a grid container on the recovery resource.

8. A computer-readable storage device comprising instructions for causing a processor to:
   query a grid manager for assignment of a resource for execution of an application, the query including a grid application recovery request;
   assign a resource having a grid application recovery service in response to the grid application recovery request;
   establish a communication channel between the assigned resource and a recovery application on a recovery resource; and
   store recovery information over the communication channel on the recovery resource during execution of the application,
   wherein the grid application recovery request reflects at least one of parts of the application to be saved during execution, how often selected parts of the application are to be saved during execution, and a description of the communication channel.

9. The computer-readable storage device of claim 8 wherein the grid application recovery request is an extended markup language (XML) file.

10. The computer-readable storage device of claim 9 wherein establishing comprises passing the XML file to the recovery application on the recovery resource.

11. The computer-readable storage device of claim 10 wherein storing comprises:
   interrupting the execution of the application in accordance with instructions in the XML file;
   saving the parts of the executing application by the recovery application on the recovery resource as indicated by the instructions in the XML file; and
   resuming the execution of the application.

12. The computer-readable storage device of claim 8 further comprising instructions to restore parameters stored in the recovery information to the application in the event of a premature termination of the execution of the application.

13. The computer-readable storage device of claim 12 further comprising instructions to restart the execution of the application.

14. The computer-readable storage device of claim 8 wherein the grid application recovery service is a web service executing inside a grid container on the recovery resource.

15. A system in a grid compute network comprising:
   a processor;
   means for querying a grid manager for assignment of a resource for execution of an application, the query including a grid application recovery request;
   means for assigning a resource having a grid application recovery service in response to the grid application recovery request;
   means for establishing a communication channel between the assigned resource and a recovery application on a recovery resource; and
   means for storing recovery information over the communication channel on the recovery resource during execution of the application,
   wherein the grid application recovery request reflects at least one of parts of the application to be saved during execution, how often selected parts of the application are to be saved during execution, and a description of the communication channel.

16. The system of claim 15 wherein the grid application recovery request is an extended markup language (XML) file.

17. The system of claim 16 wherein the means for establishing comprises passing the XML file to the recovery application on the recovery resource.

18. The system of claim 17 wherein the means for storing comprises:
   interrupting the execution of the application in accordance with instructions in the XML file;
   saving the parts of the executing application by the recovery application on the recovery resource as indicated by the instructions in the XML file; and
   resuming the execution of the application.

19. The system of claim 15 further comprising means for restoring parameters stored in the recovery information to the application in the event of a premature termination of the execution of the application.

20. The system of claim 19 further comprising means for restarting the execution of the application.

21. The system of claim 15 wherein the grid application recovery service is a web service executing inside a grid container on the recovery resource.

22. A computer-implemented method comprising:
   receiving, by a grid manager in a grid network, a query for assignment of a resource for execution of an application, the query including a grid application recovery request;
   assigning a resource having a grid application recovery service in response to the grid application recovery request; and
   establishing a communication channel between the assigned resource and a recovery application on a recovery resource;
   wherein recovery information is stored over the communication channel on the recovery resource during execution of the application, and
   wherein the grid application recovery request reflects at least one of parts of the application to be saved during execution, how often selected parts of the application are to be saved during execution, and a description of the communication channel.

23. A computer-readable storage device comprising instructions for causing a processor in a grid manager to:
   receive a query for assignment of a resource for execution of an application, the query including a grid application recovery request;

assign a resource having a grid application recovery service in response to the grid application recovery request; and establish a communication channel between the assigned resource and a recovery application on a recovery resource;

wherein recovery information is stored over the communication channel on the recovery resource during execution of the application, and wherein the grid application recovery request reflects at least one of parts of the application to be saved during execution, how often selected parts of the application are to be saved during execution, and a description of the communication channel.

24. A system in a grid compute network, the system comprising:

a processor;

means for receiving, by a grid manager, a query for assignment of a resource for execution of an application, the query including a grid application recovery request;

means for assigning a resource having a grid application recovery service in response to the grid application recovery request; and means for establishing a communication channel between the assigned resource and a recovery application on a recovery resource;

wherein recovery information is stored over the communication channel on the recovery resource during execution of the application, and wherein the grid application recovery request reflects at least one of parts of the application to be saved during execution, how often selected parts of the application are to be saved during execution, and a description of the communication channel.

* * * * *